No. 748,894. PATENTED JAN. 5, 1904.
E. N. TRUMP.
PROCESS OF TREATING MATERIAL.
APPLICATION FILED JAN. 10, 1902.
NO MODEL. 2 SHEETS—SHEET 1.
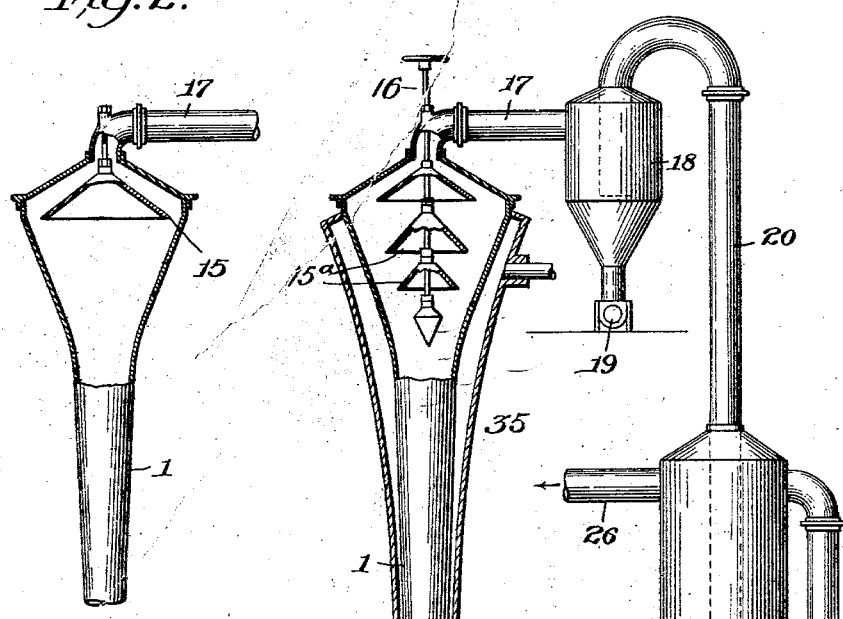
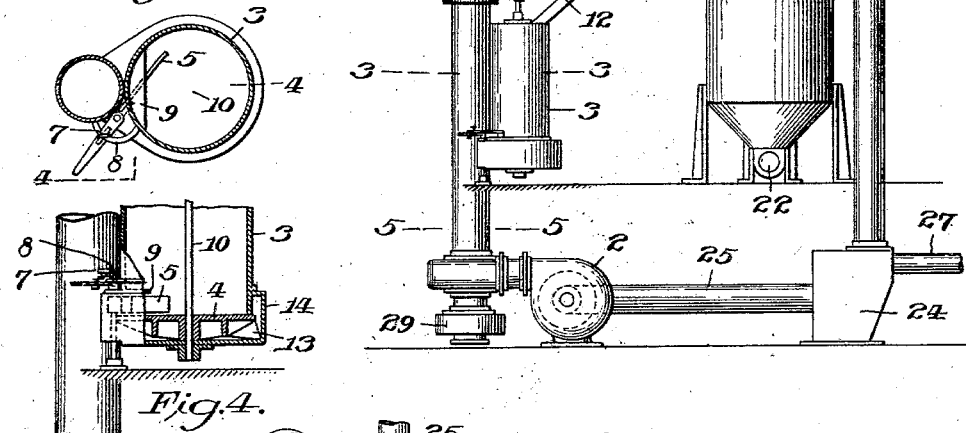
WITNESSES:
INVENTOR
Edward N. Trump
BY
ATTORNEY.

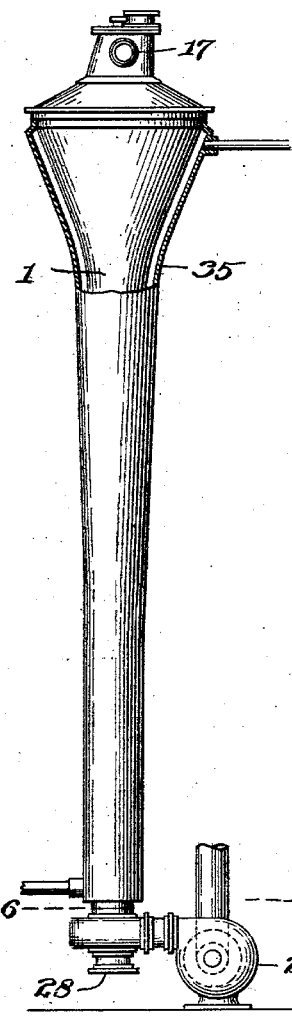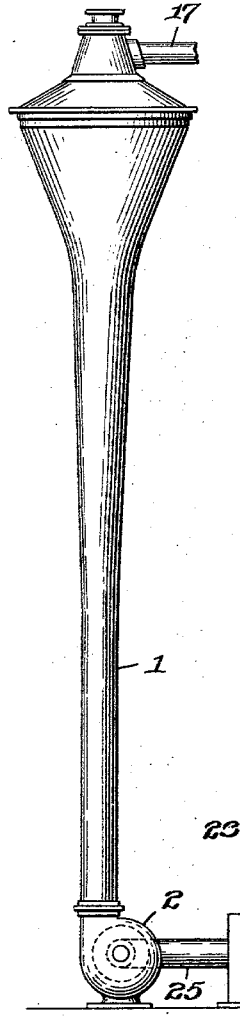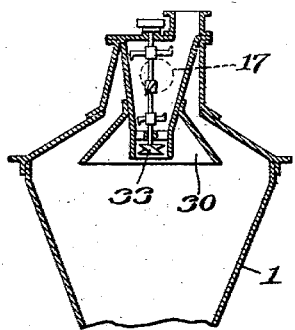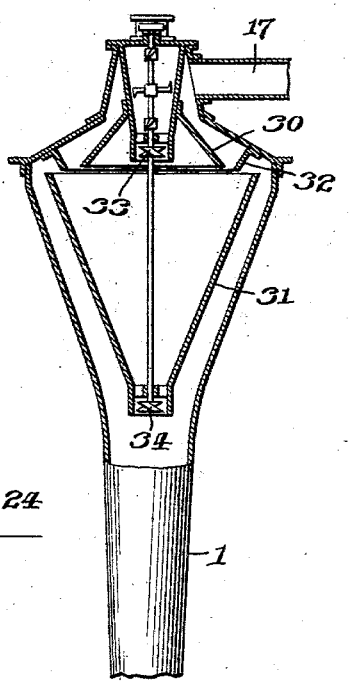

No. 748,894. Patented January 5, 1904.

UNITED STATES PATENT OFFICE.

EDWARD N. TRUMP, OF SYRACUSE, NEW YORK.

PROCESS OF TREATING MATERIAL.

SPECIFICATION forming part of Letters Patent No. 748,894, dated January 5, 1904.

Application filed January 10, 1902. Serial No. 89,165. (No specimens.)

*To all whom it may concern:*

Be it known that I, EDWARD N. TRUMP, a citizen of the United States, residing at Syracuse, in the county of Onondaga and State of New York, have invented a new and useful Process of Treating Material, of which the following is a specification.

My invention relates to improvements in a process for treating materials, such treatment being either purely physical or purely chemical in nature, or a combination of both. It may comprise in its step or steps the addition to or abstraction from a material moisture, gases, or liquids to the end of changing the physical condition of the material, rendering it a desired finished product, or, if not finished, at least putting it in a condition suitable or necessary for further treatment, or the step or steps may be operative to bring about a change in chemical composition of a material, putting it in condition for further treatment, or rendering it a finished product.

In one of its aspects the process is one of subjecting a material to a moving current of an agent, causing an intimate contact between material and agent in such manner as to automatically separate and discharge the finished material as soon as the work is complete, at the same time imparting to or abstracting from the material the required amount of heat to extract or impart moisture or to cause change in composition.

The essential feature of my invention is to induce a current of treating agent which shall act oppositely to the initial movement of the raw material to cause its suspension, but which shall afterward select and carry off with said current the finished material. For instance, by introducing the particles of material into an upwardly-moving current of treating agent of varying velocity, by which it is first suspended against the action of gravity, and as its specific gravity is changed by the action of the treating agent its position is automatically changed until the desired purpose is attained and the material discharged.

Referring to the drawings, Figure 1 is a view in elevation of my apparatus. Fig. 1ª is a plan view below the line 5 5, Fig. 1, of the stack and blower, showing a rheostat-controlled electric motor for driving the blower. Fig. 2 is a detail of the upper part of the stack with part of the wall thereof broken away to show a modification in baffle-plates. Fig. 3 is a horizontal section, slightly enlarged, on the line 3 3 of Fig. 1. Fig. 4 is a vertical section of the lower part of the table-feed on line 4 4 of Fig. 3. Fig. 5 is an elevation of part of my device, showing the feed at the top of the stack and also a heating-jacket surrounding said stack. Fig. 6 is a plan view below the line 6 6 of Fig. 5. Fig. 7 is an elevation of the stack, showing means for introducing a direct vertical current into the bottom thereof. Fig. 8 is a cross-section, somewhat enlarged, of the upper part of the stack, as shown in Fig. 7, showing means for feeding the material and arrangement of baffles; and Fig. 9 is a similar view showing modifications in baffle and feed.

Similar numerals refer to similar parts throughout the several views.

Referring to Fig. 1, the stack or chamber 1 is disposed vertically with respect to its longitudinal extension and has a gradually-increasing area of cross-section from near the middle portion to the top. The treating agent is introduced at the bottom of the stack by the fan or blower 2. It may be delivered into the stack in a direct upward or vertical direction, as would be the case by the construction shown in Fig. 7, or it may be delivered in a spiral tangent to the side, as the result of the construction shown in Figs. 1, 5, and 6, which will give it a whirling upward current in a spiral course for the purpose hereinafter to be stated. The material to be treated may be fed into the stack either vertically, horizontally, or inclined at any suitable point above the entrance of the treating agent or, in fact, in any manner, so that the same will be brought into said current of treating agent.

In the device shown in Figs. 5 and 7 a vertical feed is employed, (shown in detail in Figs. 8 and 9,) consisting of a funnel-shaped opening provided with agitators and a screw 33 or screws 33 and 34 to assure the movement of the material into the stack. In Fig. 1 I show a device employing a table-feed. (Shown in detail in Figs. 3 and 4.) This consists of the receptacle 3, having a revolving table 4 at or near its bottom which cooperates with a blade 5 to deflect the material to be delivered through an intake-aperture into the stack. The blade 5 is adjustable, having a set-screw 7 adapted to coöperate with the arc 8 to change the angular position of the blade to cause it to encounter more or less of the material with each revolution of the table, as may be desired. The horizontal segment or shield 9 is so disposed above the intake-aperture of the stack as to prevent the natural slope of the material from extending beyond the edge of the revolving table and to assure a steady feed that can be controlled or regulated. This also assures a continuous mass of material above the intake-aperture to form a seal over said intake to prevent the escape of treating agent from the stack. The revolving table 4 is mounted on the shaft 10 and may be driven by any suitable means operating through the gear 11. The material may be fed into the receptacle 3 through the trough or chute 12 or by any other suitable means. A plow or scraper 13 is secured to the under side of the revolving table and is adapted to feed into the stack the material that falls into the chamber 14 between the revolving table and the lower edges of the wall of the receptacle 3.

In Figs. 1, 1ª, 5, and 6 I show the means for inducing a current of treating agent consisting of a fan or blower 2, delivering tangentially into the bottom of the stack, which causes an upward spiral current through the stack. The fan or blower 2 is driven by an electric motor 36, deriving its current from a source 37 and controlled by rheostat 38 to regulate the speed of the blower, and consequently the velocity of the air-current induced.

In Fig. 2 the baffle-plate 15 is disposed approximately the exit point or outlet of the treating agent and finished material and is adapted to coöperate in the separation of the finished from the raw material, as in the case of the baffle-plates 15ª in Fig. 1.

In Fig. 1 I show a baffle means in which a series of baffles 15ª are mounted upon a single shaft and correspond, respectively, to the relative areas of cross-section of the surrounding stack with respect to the position of each. The supporting-rod 16 is adapted to be raised or lowered as adjustable means for controlling the passage for the treating agent and the material carried thereby to the exit 17, such adjustment being desirable to meet the conditions of the different materials to be treated or the different ways of treating same.

In Figs. 8 and 9 I show a further modification of baffles where the feed is in the top of the stack and through said baffles, the purpose being as above described and also to assure the separation of the outgoing from the incoming material.

In Fig. 9 I show oppositely-disposed baffle-plates 30 and 31 with an intermediate baffle 32, through all of which baffles the raw material is fed, the movement of same being assured by the screws 33 and 34. The purpose of this arrangement of baffles is to assure the separation from the outgoing material of material that is not perfectly finished or dried. As the said material strikes against the baffle 32 some of it is deflected over the edges of baffle 31 and is carried downward with the raw material, while only the dry portion of the material escapes upward between the edges of baffles 30 and 32 and the exit 17.

In Figs. 1 and 5 I show the stack surrounded by a heating-jacket 35, into which hot air or gas, hot water or steam may be introduced for heating the walls of the stack for the purpose hereinafter described.

The upper part of the stack communicates with the discharge-pipe 17, which leads to the separator 18 of the type known as the "cyclone" separator, which is provided at its base with the conveyer 19 to carry off the material separated from the treating agent passing through 18. The separator 18 is also connected with the pipe 20, leading to the dust-receiver or second separator 21. At the bottom of the dust-receiver 21 is a second conveyer 22, serving a similar purpose as that of conveyer 19. The dust-receiver 21 is also connected with the pipe 23, which carries the treating agent, now having been relieved of the material treated downwardly to the heater 24, thence through pipe 25 to blower or fan 2 and back to the stack 1. The dust-receiver 21 is also provided with a valve-controlled exit 26 for releasing such part of the treating agent as may be desirable, and connected with the heater 24 is provided a valve-controlled inlet 27 for the purpose of taking in fresh treating agent or an ingredient thereof, as may from time to time be desirable. When gas is used, it is obvious that inlet 27 may be connected with any suitable gas-reservoir or source of gas-supply. (Not shown.) A port 28 is provided at the bottom of the stack for the purpose of taking out material that may have fallen below the blower or the current of treating agent maintained thereby by cause of too heavy feeding of material into the stack, or the larger receptacle 29 may be provided, as shown in Fig. 1, for collecting said material, so that it need only be removed at intervals.

The operation of my device is as follows: Taking, for example, the apparatus constructed as shown in Fig. 1, the material is fed into the stack 1 at 6 by the table-feed and encounters the current of treating agent rising vertically or in a spiral course from the blower or fan 2. Where the purpose is to dry finely-divided moist material, the current of treating agent is so regulated that the moist material will just remain suspended in the lower portion of the stack, being kept in motion by said upward current. As its weight decreases by the driving off of the moisture in the product, which is very quickly accomplished by the intimate contact with the treating agent, the material ascends toward the top of the stack and when it becomes quite dry is carried off by the current of treating agent through pipe 17 to separator 18. The regulation of the current is accomplished by the regulation of the speed of the fan or blower 2. This may be accomplished, as shown in Fig. 1ª, by a rheostat-controlled electric motor 36 or in any other of a number of well-known ways. The treating agent delivered into the bottom of the stack being first heated in the heater 24, gives up its heat to the material to be treated and to the moisture contained therein to cause its evaporation. It will also be noted that inasmuch as the area of cross-section of the stack is less at its lower extension the vertical velocity of the current of treating agent will be greater there than in the upper portion of the stack, where the area of cross-section is greater and the current of treating agent consequently becomes dispersed, and thus loses in vertical velocity. By this loss of vertical velocity of the current due to its gradually-widening spiral course consequent upon the increasing area of cross-section of the stack toward its upper extension it results that at a certain distance above the intake-point of material the said vertical velocity of the current is insufficient to support or suspend the raw or wet material, but is only sufficient to suspend the dryer or partially-finished material. The point at which the current will not suffice to suspend the raw or wet material will depend upon the adjustment of the initial speed of current, rate of feed, and condition of material and the various respective cross-sections and longitudinal dimensions of the stack.

As above indicated, by the proper adjustment of the above-mentioned factors of initial speed of current, rate of feed, and cross-section, and longitudinal dimensions of stack a point exists where the raw or wet material will not be supported by the current; but to be supported at this point the material must be partially finished or dried. It follows that as the area of cross-section of the stack increases as the stack ascends the vertical force or velocity of the current decreases in like proportion, and consequently the higher in the stack that the material is suspended the more completely dried or finished it must be. It will thus be seen that from the point where the current is at first able to suspend the raw or wet material to the top of the stack there is a constant and automatic separation of the finished from the less finished material until the perfectly finished and dry material is delivered at the top entirely free from any of the unfinished portions of the material.

The whirling or spiral course of the current of treating agent produced by the construction shown in Figs. 1, 5, and 6 is useful for causing a greater agitation of the material to be treated and a more thorough commingling of the treating agent with its particles. It is also to be noted that where the current has an upward spiral course the heavier—that is, the moist or unfinished—material will be driven to the outer side of the current and against the walls of the chamber, while the finished or lighter materials will assume an inner position, the wet or unfinished displacing or forcing out of the outer portions of the current the material that has become finished or dried, and especially in case where the heating-jacket is used the heavier or wet material is kept in contact with the hot walls of the stack until it becomes dried or finished, when it is immediately displaced by other moist material, since the moist material, being heavier, will always seek the larger circle and force the dry material away. Thus the spiral current insures the position of the moist material at all times for its most efficient treatment. In this respect the said current may be appropriately termed an "operating" agent.

A further regulation of the current of treating agent at the top of the stack may be secured by the proper adjustment of baffle plate or plates—such, for instance, as are shown in Fig. 1. By lowering the rod supporting these plates their peripheries approach the surrounding wall of the stack and restrict the passage therebetween of the treating agent laden with the dry material, such adjustment being made to suit the nature of the material to be treated. Suitable adjustment may also be made between the velocity of the current of treating agent delivered at the bottom of the stack and the rate of feed of material delivered into the stack, the former by controlling the speed of the blower or fan 2, as above described, and the latter either by similarly regulating the speed of the revolving table 4 or changing the angular position of the deflecting-blade 5, or both. Thus with due regard to the dimensions of the stack the feed of material and the velocity of the current of treating agent may be exactly adjusted to the work to be done in the more efficient way.

As already stated, the dry material is carried from the top of the stack through pipe 17 to the cyclone separator 18, where the dry material falls from the treating agent to the bottom of separator 18 and is carried off by the conveyer 19. The treating agent passes out of separator 18 through pipe 20 to the dust-receiver 21, where any particles of material that still remain in the treating agent collect and are carried off by the conveyer 22. The treating agent is then conducted from the dust-receiver 21 through pipe 23 to heater 24, thence through pipe 25 to blower or fan 2 and back to stack 1. In the case where moisture is to be carried off from the material a portion of the treating agent may be allowed to escape at exit 26, only a portion being taken back to the heater 24, where fresh air or other treating agent or ingredient thereof is added through the inlet 27.

Of course the stack 1 in whatever combination used and whether for drying, chemical treatment, or other purpose may be heated, as shown and described in connection with Figs. 1 and 5, and as the material, especially where given a spiral motion, comes in very intimate contact with the interior surface of the stack the heat will be transmitted to it with great efficiency and a large product obtained. It is to be understood also that any of the feed devices shown or others may be used in any of the systems shown or the equivalents of such systems, and, further, that any of the various baffle and separating devices or their equivalents herein shown and described may be used in any of the systems or their equivalents herein disclosed.

My process is not limited to the utilization of a single treating agent, but may include in addition to the suspending agent the introduction into the system at any point of one or more other agents whose purpose is to act upon the material under treatment in a manner peculiar to itself or themselves. For example, I may introduce into the treating system carbon dioxid for the purpose of making a monocarbonate of soda into a bicarbonate of soda.

What I claim is—

1. The process of treating material, which consists in introducing it into an upward current of treating agent decreasing in velocity as it ascends, whereby the material is continuously suspended in said current during treatment.

2. The process of treating material, which consists in introducing it into an upward current of treating agent decreasing in velocity as it ascends, whereby the material is continuously suspended in said current during treatment, and advanced by the current as it approaches the finished state.

3. The process of treating material, which consists in introducing it into an upward spiral current of treating agent decreasing in velocity as it ascends, whereby the material is suspended in said current during treatment.

4. The process of treating material, which consists in introducing it into an upward spiral current of treating agent decreasing in velocity as it ascends, whereby the material is suspended in said current during treatment and advanced by the current as it approaches the finished state.

5. The process of treating material, which consists in suspending the material during treatment in an upward rotary current of an operating agent, imparting heat to said agent prior to the introduction of the material into it, and imparting heat to the material and agent during treatment.

6. The process of treating material, which consists in introducing it into an upward rotary current of operating agent having a decreasing upward velocity and imparting heat to the material and agent during treatment.

7. The process of treating material, which consists in passing an operating agent through a closed circulatory system, imparting to said operating agent an upward rotary motion, and suspending the material to be treated in the upward rotary current of the agent.

8. The process of treating material, which consists in producing an upward rotary current of a treating agent, feeding the material to be treated into said current, and adjusting the speed of current and rate of feed with relation to each other so as to cause a suspension of the material in the current during treatment.

9. The process of treating material, which consists in producing an upward current of decreasing vertical velocity, feeding the material into said current, and adjusting the speed of current and rate of feed with relation to each other so as to cause a continuous suspension of the material in the current during treatment.

10. The process of treating material, which consists in producing an upward spiral current of decreasing vertical velocity, feeding the material into said current, and adjusting the speed of current and rate of feed with relation to each other so as to cause a suspension of the material in the current during treatment.

11. The process of treating material, which consists in producing an upward current of treating agent diminishing in velocity as it ascends, mingling the material to be treated with said agent, whereby the material is continuously suspended in said agent during treatment, and advanced in the current as it approaches the finished state, thereby causing the separation of the finished from the unfinished material.

12. The process of drying material, which consists in introducing the material into an aeriform current of decreasing upward velocity so that the material shall be continuously suspended in said current by the action thereof until dried.

13. The process of drying material, which consists in introducing the material into an aeriform current of decreasing upward velocity, whereby the material is continuously suspended in said current until dried and then carried off.

14. The process of treating material, which changes in specific gravity during treatment, which consists in feeding the material to be treated into an aeriform current of decreasing vertical velocity, whereby the material is continuously suspended in said current against gravity during the period of its treatment, automatically transported upward as it diminishes in weight, and the finished material selected from the unfinished material.

15. The process of treating material, which consists in introducing it into an aeriform current of gradually-decreasing vertical velocity, so that the material shall be suspended against gravity by the action of said current in the higher velocity of said current, automatically transported as it approaches the finished state to regions of progressively-diminishing velocity of the current, and the finished material carried off from the region of low velocity.

16. The process of drying material, which consists in introducing it into an upward spiral current of air, so that the material shall be suspended against gravity by the action of said current until dried, and the dried material automatically separated from the undried material.

17. The process of drying material, which consists in introducing it into an upward spiral current of air of gradually-decreasing velocity, so as to suspend the material against gravity by the action of said current until dried, and automatically to separate the dried from the undried material.

18. The process of drying material, which consists in introducing it into an upward current of air of gradually-decreasing vertical velocity, so as to suspend the material against gravity by the action of said current until dried, and automatically to separate the dried from the undried material.

19. The process of drying material, which consists in producing an upward rotary current of air, suspending the moist material in and by the action of said current, imparting heat to the material during its suspension, and discharging the dry material.

20. The process of drying material, which consists in introducing it into an upward current of heated air diminishing in velocity as it ascends so as to suspend the material against gravity by the action of said current until dried, and automatically to separate the dried from the undried material.

21. The process of drying material, which consists in suspending it in an upward spiral current of air in and by the action of said current, and imparting heat to the material during its suspension.

22. The process of drying material, which consists in suspending it in an upward spiral current of air of decreasing velocity in and by the action of said current, and imparting heat to the material during its suspension.

23. The process of drying material, which consists in suspending it in an upward spiral current of heated air in and by the action of said current, and imparting heat to the material during its suspension.

24. The process of drying material, which consists in producing an upward current of air, continuously suspending the moist material in and by the action of said current, and imparting heat to the material during its suspension, whereby the dry material is transported in said current.

EDWARD N. TRUMP.

Witnesses:
   CHAS. N. TRUMP,
   JOHN THIEL.